United States Patent
Draper

(10) Patent No.: US 10,211,614 B2
(45) Date of Patent: Feb. 19, 2019

(54) ELECTRICAL OUTLET LOCKING MECHANISM

(71) Applicant: Robert Draper, Roswell, GA (US)

(72) Inventor: Robert Draper, Roswell, GA (US)

( * ) Notice: Subject to any disclaimer, the term of this patent is extended or adjusted under 35 U.S.C. 154(b) by 0 days.

(21) Appl. No.: 15/804,885

(22) Filed: Nov. 6, 2017

(65) Prior Publication Data
US 2018/0226780 A1 Aug. 9, 2018

Related U.S. Application Data

(60) Provisional application No. 62/455,595, filed on Feb. 7, 2017.

(51) Int. Cl.
*H02G 3/08* (2006.01)
*H02G 3/14* (2006.01)

(52) U.S. Cl.
CPC .............. *H02G 3/081* (2013.01); *H02G 3/14* (2013.01)

(58) Field of Classification Search
CPC ...................................................... H02G 3/081
USPC ....................................................... 174/66, 67
See application file for complete search history.

(56) References Cited

U.S. PATENT DOCUMENTS

| | | | | |
|---|---|---|---|---|
| 5,998,735 A | * | 12/1999 | Patterson, Jr. ........... | H02G 3/14 174/67 |
| 8,063,303 B1 | * | 11/2011 | McBain ............. | H01R 13/4534 174/66 |
| 8,912,442 B2 | * | 12/2014 | Smith ...................... | H02G 3/14 174/66 |

* cited by examiner

*Primary Examiner* — Dhiru R Patel
(74) *Attorney, Agent, or Firm* — Incorporating Innovation LLC; Charlena Thorpe, Esq.

(57) ABSTRACT

Implementations of an electrical outlet locking mechanism to attach to an electrical outlet are provided. In some implementations, the electrical outlet locking mechanism includes a cover plate adapter and a socket cover attachment to attach to the cover plate adapter to locking cover an electrical socket of an electrical outlet. In some implementations, the electrical outlet lockingly mechanism includes a cover plate adapter and a plug retainer attachment to attach to the cover plate adapter to lockingly retain an electrical plug in engagement with an electrical socket of an electrical outlet.

13 Claims, 2 Drawing Sheets

ELECTRICAL OUTLET LOCKING MECHANISM

CROSS REFERENCE TO RELATED APPLICATION

This application claims the benefit of U.S. Patent Application Ser. No. 62/455,595, which was filed on Feb. 7, 2017, and is incorporated herein by reference in its entirety.

TECHNICAL FIELD

This disclosure relates to implementations of an electrical outlet locking mechanism.

BACKGROUND

It is desirable to child-proof areas to which young children have access to prevent injuries or death. Child proofing electrical outlets is an on-going concern. However, existing methods to prevent electrical contact injuries (e.g., shock or electrocution) from electrical outlets are insufficient. There does not exist methods for efficiently locking covers to existing cover plates of electrical outlets or locking in place existing plugs for electrical outlets.

DETAILED DESCRIPTION

Implementations of an electrical outlet locking mechanism to attach to an electrical outlet are provided. In some implementations, the electrical outlet locking mechanism comprises a cover plate adapter and a socket cover attachment to attach to the cover plate adapter to lockingly cover an electrical socket of an electrical outlet. In some implementations, the electrical outlet locking mechanism comprises a cover plate adapter and a plug retainer attachment to attach to the cover plate adapter to lockingly retain an electrical plug in engagement with an electrical socket of an electrical outlet.

Figure 1:
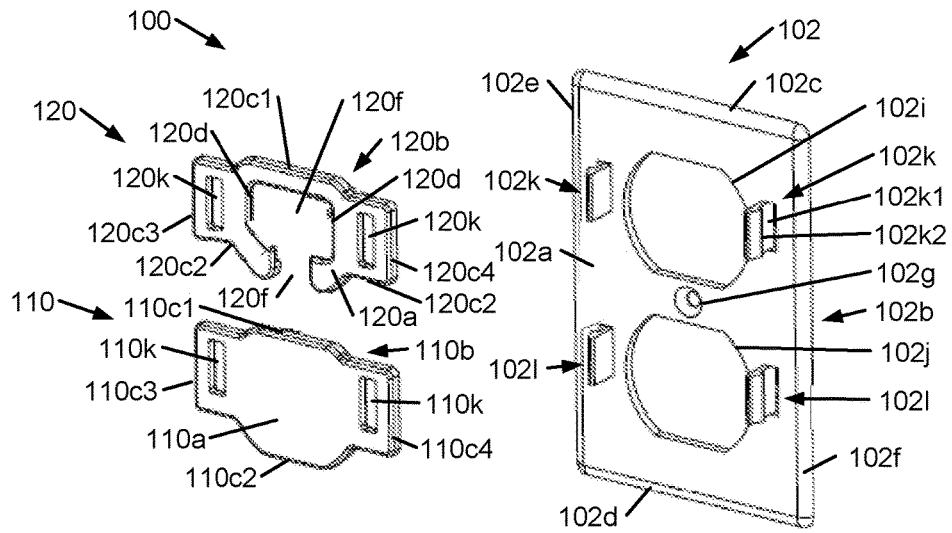
FIG. 1 illustrates an example implementation of an electrical outlet locking mechanism according to the present disclosure.

FIG. 1 illustrates an example implementation of an electrical outlet locking mechanism 100 according to the present disclosure. In some implementations, the electrical outlet locking mechanism 100 comprises a cover plate adapter 102 and a socket cover attachment 110 and/or a plug retainer attachment 120.

In some implementations, the cover plate adapter 102 comprises an attachment opening 102g, a first socket access opening 102i, a second socket access opening 102j, a first pair of retaining tabs 102k on opposite sides of the first socket access opening 102i, and a second pair of retaining tabs 102l on opposite sides of the second socket access opening 102j.

In some implementations, the cover plate adapter 102 comprises a front surface 102a extending lengthwise from a top surface 102c to a bottom surface 102d and widthwise from a left side surface 102e to a right side surface 102f, a back surface 102b opposite the front surface 102a extending lengthwise from a top surface 102c to a bottom surface 102d and widthwise from left side surface 102e to a right side surface 102f, a top surface 102c extending lengthwise from the left side surface 102e to the right side surface 102f and extending widthwise from the front surface 102a to the back surface 102b, a bottom surface 102d opposite the top surface 102c extending lengthwise from the left side surface 102e to the right side surface 102f and extending widthwise from the front surface 102a to the back surface 102b, a left side surface 102e extending lengthwise from the top surface 102c to the bottom surface 102d and extending widthwise from the front surface 102a to the back surface 102b, and a right side surface 102f opposite the left side surface 102e extending lengthwise from the top surface 102c to the bottom surface 102d and extending widthwise from the front surface 102a to the back surface 102b.

In some implementations, the cover plate adapter 102 may be rectangular. In some implementations, the cover plate adapter 102 may be any suitable shape.

In some implementations, the attachment opening 102g may be an opening that extends through the front surface 102a and the back surface 102b of the cover plate adapter 102. In some implementations, the attachment opening 102g may be configured to receive a screw (e.g., screw 150d of FIG. 2) to attach the cover plate adapter 102 to a surface such as an existing cover plate of an electrical outlet (e.g., cover plate 150a of electrical outlet 150 of FIG. 2). In some implementations, the attachment opening 102g may be positioned to align with a screw opening in a cover plate for an electrical outlet (e.g., screw opening 150b of cover plate 150a of FIG. 2).

In some implementations, the first socket access opening 102i and the second socket access opening 102j are openings that extend through the front surface 102a and the back surface 102b of the cover plate adapter 102. Each of the first socket access opening 102i and the second socket access opening 102j is sized and positioned to provide access to an electrical socket of an electrical outlet (e.g., electrical socket 150h, 150i of electrical outlet 150 of FIG. 2). For example, in some implementations, each of the first socket access opening 102i and the second socket access opening 102j is sized and positioned to insert an electrical plug therethrough to engage an electrical socket of an electrical outlet.

In some implementations, the first pair of retaining tabs 102k and the second pair of retaining tabs 102l extend from the front surface 102a of the cover plate 102. In some implementations, the first pair of retaining tabs 102k and the second pair of retaining tabs 102l extend perpendicular to the front surface 102a of the cover plate 102. In some implementations, each retaining tab comprises a first part (e.g., part 102k1) that extends from the front surface 102a and a second part (e.g., part 102k2) that extends from the first part to form a projecting edge (e.g., a ledge or lip).

In some implementations, the socket cover attachment 110 comprises a front surface 110a extending lengthwise from a top surface 110c1 to a bottom surface 110c2 and widthwise from a left side surface 110c3 to a right side surface 110c4, a back surface 110b opposite the front surface 110a extending lengthwise from a top surface 110c1 to a bottom surface 110c2 and widthwise from left side surface 110c3 to a right side surface 110c4, a top surface 110c1 extending lengthwise from the left side surface 110c3 to the right side surface 110c4 and extending widthwise from the front surface 110a to the back surface 110b, a bottom surface 110c2 opposite the top surface 110c1 extending lengthwise from the left side surface 110c3 to the right side surface 110c4 and extending widthwise from the front surface 110a to the back surface 110b, a left side surface 110c3 extending lengthwise from the top surface 110c1 to the bottom surface 110c2 and extending widthwise from the front surface 110a to the back surface 110b, and a right side surface 110c4 opposite the left side surface 110c3 extending lengthwise from the top surface 110c1 to the bottom surface 110c2 and extending widthwise from the front surface 110a to the back surface 110b.

In some implementations, the socket cover attachment 110 includes a pair of retaining openings 110k on opposite sides of the socket cover attachment 110 that extend through the front surface 110a and the back surface 110b of the socket cover attachment 110.

In some implementations, the pair of retaining openings 110k socket cover attachment 110 are configured to receive a pair of retaining tabs 102k or 102l, respectively, of the cover plate adapter 102. In some implementations, the pair of retaining openings 110k are configured to align with a pair of retaining tabs 102k or 102l of the cover plate adapter 102 to attach the socket cover attachment 110 to the cover plate adapter 102.

In some implementations, the pair of retaining openings 110k of the socket cover attachment 110 and a pair of retaining tabs 102k or 102l of the cover plate adapter 102 are configured to lockingly engage with each other. In some implementations, the pair of retaining openings 110k of the socket cover attachment 110 and a pair of retaining tabs 102k or 102l of the cover plate adapter 102 are configured so that when the pair of retaining openings 110k receives a pair of retaining tabs 102k or 102l of the cover plate adapter 102, respectively, a portion of the front surface 110a of the socket cover attachment 110 is positioned under the projecting edge of the retaining tabs 102k or 102l thereby lockingly engaging the socket cover attachment 110 and the cover plate adapter 102.

In some implementations, the socket cover attachment 110 is configured to cover a socket of an electrical outlet (e.g., socket 150h or 150i of the electrical outlet 150 of FIG. 2) when the socket cover attachment 110 receives and lockingly engages through the retaining openings 110k a pair of the retaining tabs 102k or 102l of the cover plate adapter 102. In some implementations, the socket cover attachment 110 is configured to fully cover the openings of the socket of an electrical outlet from at least one direction.

Figure 2:
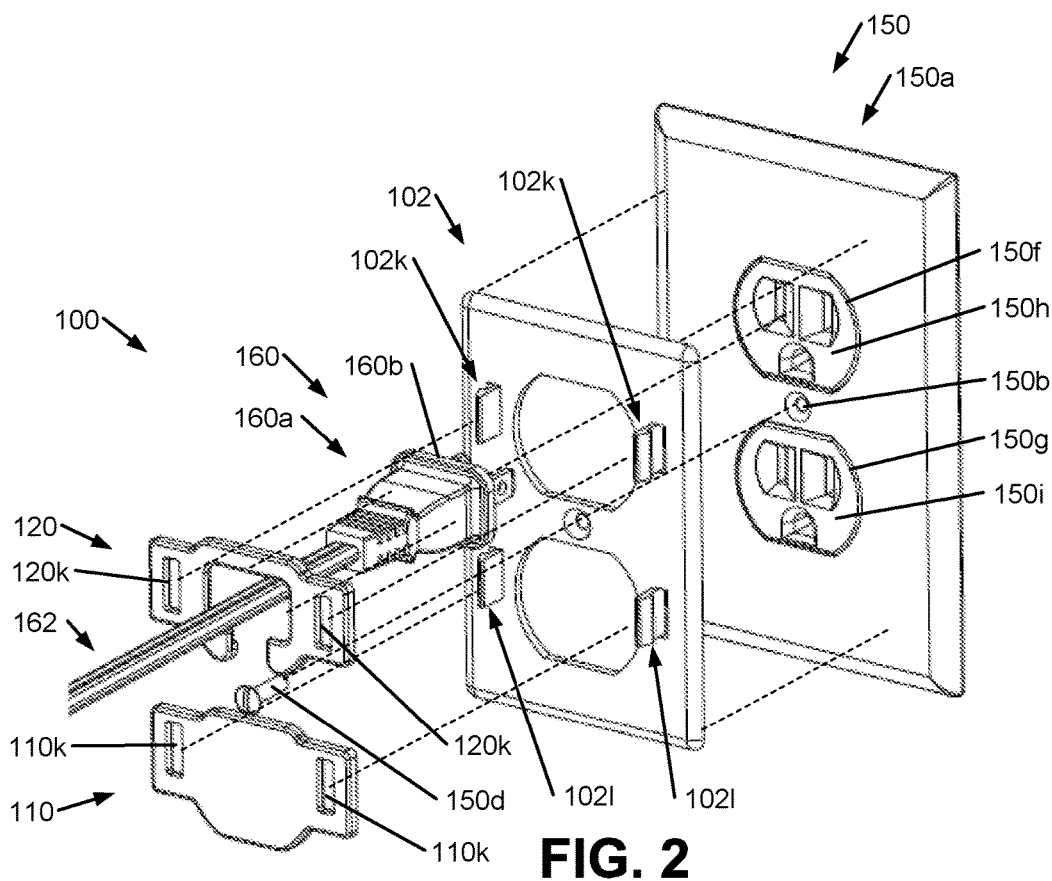
FIGS. 2-3 illustrates an example method of using the electrical outlet locking mechanism of FIG. 1 according to the present disclosure.

In this way, in some implementations, the socket cover attachment 110 lockingly prevents access to a socket of an electrical outlet (e.g., socket 150h or socket 150i of electrical outlet 150 of FIG. 2) when the cover plate adapter 102 is attached to a cover plate (e.g., cover plate 150a) of the electrical outlet and the socket cover attachment 110 receives and lockingly engages through the retaining openings 110k a pair of the retaining tabs 102k or 102l of the cover plate adapter 102.

In some implementations, the plug retainer attachment 120 comprises a front surface 120a extending lengthwise from a top surface 120c1 to a bottom surface 120c2 and widthwise from a left side surface 120c3 to a right side surface 120c4, a back surface 120b opposite the front surface 120a extending lengthwise from a top surface 120c1 to a bottom surface 120c2 and widthwise from left side surface 120c3 to a right side surface 120c4, a top surface 120c1 extending lengthwise from the left side surface 120c3 to the right side surface 120c4 and extending widthwise from the front surface 120a to the back surface 120b, a bottom surface 120c2 opposite the top surface 120c1 extending lengthwise from the left side surface 120c3 to the right side surface 120c4 and extending widthwise from the front surface 120a to the back surface 120b, a left side surface 120c3 extending lengthwise from the top surface 120c1 to the bottom surface 120c2 and extending widthwise from the front surface 120a to the back surface 120b, and a right side surface 120c4 opposite the left side surface 120c3 extending lengthwise from the top surface 120c1 to the bottom surface 120c2 and extending widthwise from the front surface 120a to the back surface 120b.

In some implementations, the plug retainer attachment 120 comprises an opening 120f that extends lengthwise from the bottom surface and through the front surface 102a and the back surface 102b of the plug retainer attachment 120. In some implementations, the opening 120f defines an inner edge 120d.

In some implementations, the width of the opening 120f is smaller at the bottom surface than at the opposite side of the opening 120f. In some implementations, the width of the opening 120f at the bottom surface 120c2 is sized to receive an electrical cord connected to an electrical plug (e.g., electrical cord 162 connected to electrical plug 160 of FIG. 2).

In some implementations, the opening 120f is configured to partially receive an electrical plug (e.g., electrical plug 160 of FIG. 2). In some implementations, the inner edge 120d is configured to engage the outer surface of an electrical plug (e.g., outer surface 160a of electrical plug 160 of FIG. 2). In some implementations, the largest width of the opening 120f is smaller than the largest width of an electrical plug so that the opening 120f partially receives the electrical plug. In some implementations, the opening 120f is configured so that a portion of the back surface 120b adjacent to the opening 120f rests on a ledge of an electrical plug (e.g., ledge 160b of electrical plug 160 of FIG. 2).

In some implementations, the plug retainer attachment 120 includes a pair of retaining openings 120k on opposite sides of the plug retainer attachment 120 that extend through the front surface 120a and the back surface 120b of the plug retainer attachment 120.

In some implementations, the retaining openings 120k are the same as retaining openings 110k.

In some implementations, the plug retainer attachment 120 is configured to lockingly retain an electrical plug in engagement with a socket (e.g., electrical plug 160 in engagement with socket 150h of FIG. 2) when the plug retainer attachment 120 receives the electrical plug through the opening 120f and receives and lockingly engages through the retaining openings 120k a pair of the retaining tabs 102k or 102l of the cover plate adapter 102.

In this way, in some implementations, the plug retainer attachment 120 lockingly prevents access to an electrical plug in engagement with a socket of an electrical outlet when the plug retainer attachment 120 is attached to a cover plate (e.g., cover plate 150a) of the electrical outlet and the plug retainer attachment 120 receives the electrical plug through the opening 120f and receives and lockingly engages through the retaining openings 120k a pair of the retaining tabs 102k or 102l of the cover plate adapter 102.

In some implementations, the electrical outlet locking mechanism 100 or various components thereof may be composed of a plastic. In some implementations, the electrical outlet locking mechanism 100 or various components thereof may be composed of any suitable material. In some implementations, the electrical outlet locking mechanism 100 or various components thereof may be any suitable colors.

Figure 3:
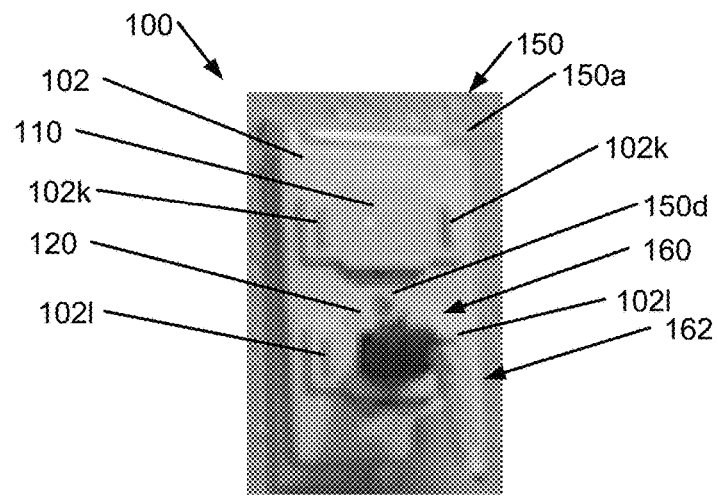

FIGS. 2 and 3 illustrate an example method of using the electrical outlet locking mechanism 100 of FIG. 1 to lockingly cover an electrical socket 150i of an electrical outlet 150 or lockingly retain an electrical plug 160 in engagement with an electrical socket 150h of an electrical outlet 150 according to the present disclosure.

As shown in FIG. 2, in some implementations, a cover plate 150a may attach to the electrical outlet 150. In some implementations, the cover plate 150a comprises a screw opening 150b, a first socket opening 150f configured to insert an electrical plug therethrough to engage a first electrical socket 150h of an electrical outlet, and a second socket opening 150g configured to insert an electrical plug therethrough to engage a second electrical socket 150i of an electrical outlet.

In some implementations, the electrical outlet 150 may have a standard duplex outlet configuration and the cover plate 150a may have a standard duplex outlet cover plate configuration.

In some implementations, the electrical plug 160 may be a two prong plug. In some implementations, the electrical plug 160 may be a three prong plug.

To use the electrical outlet locking mechanism 100, the cover plate adapter 120 is attached to the cover plate 120. In some implementations, the cover plate adapter 120 is attached to the cover plate 120 by aligning the attachment opening 102g of the cover plate adapter 102 with the screw opening 150b of the cover plate 150a. In some implementations, the first socket access opening 102i and the second socket access opening 102j of the cover plate adapter 102 are aligned with the first socket opening 150f and the second socket opening 150g, respectively, of the cover plate 102 to access the first electrical socket 150h and second electrical socket 150i, respectively. In some implementations, a screw 150d is inserted through the attachment opening 102g and the screw opening 150b to attach the cover plate adapter 102 to the cover plate 150a and attach the cover plate 150a to the electrical outlet 150.

In some implementations, the cover plate adapter 102 may replace the cover plate 150a and the cover plate adapter 102 may directly cover the electrical outlet 150.

In some implementations, the socket cover attachment 110 may be attached to the cover plate adapter 102 to lockingly prevent access to an electrical socket (e.g., socket 150i) of the electrical outlet 150. In some implementations, the socket cover attachment 110 is attached to the cover plate adapter 102 by aligning the pair of retaining openings 110k of the socket cover attachment 110 with the pair of retaining tabs 102l of the cover plate adapter 102 and then moving the socket cover attachment 110 toward the pair of retaining tabs 102l until the retaining openings 110k receive the retaining tabs 102l, respectively, thereby attaching the socket cover attachment 110 to the cover plate adapter 102 and covering the socket 150i of the electrical outlet 150.

In some implementations, the plug retainer attachment 120 may be attached to the cover plate adapter 102 to lockingly retain an electrical plug (e.g., electrical 160) in engagement with an electrical socket (e.g., socket 150h) of the electrical outlet 150.

In some implementations, the plug retainer attachment 120 is attached to the cover plate adapter 102 by passing the electrical cord 162 of the electrical plug 160 through the opening 120f of the plug retainer attachment 120 at the bottom surface 120c2 of the plug retainer attachment 120 and positioning a portion of the plug 160 in the opening 120f of the plug retainer attachment 120 so that the inner edge 120d engages the outer surface 160a of the electrical plug 160. Then, the pair of retaining openings 120k of the plug retainer attachment 120 are aligned with the pair of retaining tabs 102k of the cover plate adapter 102 and the plug retainer attachment 120 is moved toward the pair of retaining tabs 102k until the retaining openings 120k receive the retaining tabs 102k, respectively thereby attaching the plug retainer attachment 120 to the cover plate adapter 102 to lockingly retain the electrical plug 160 in engagement with a socket 150h.

In some implementations, the plug retainer attachment 120 is moved to position a portion of the plug 160 in the opening 120f of the plug retainer attachment 120 while the electrical plug 160 is engaged with the socket 150i of the electrical outlet 150 through the socket access opening 102i of the cover plate adapter 102 and through the socket opening 150f of the cover plate 150a.

In some implementations, a portion of the plug 160 is positioned in the opening 120f of the plug retainer attachment 120 while the electrical plug 160 is not engaged with the socket 150i of the electrical outlet 150.

Reference throughout this specification to "an embodiment" or "implementation" or words of similar import means that a particular described feature, structure, or characteristic is included in at least one embodiment of the present invention. Thus, the phrase "in an embodiment", "in some implementations", or a phrase of similar import in various places throughout this specification does not necessarily refer to the same embodiment.

Many modifications and other embodiments of the inventions set forth herein will come to mind to one skilled in the art to which these inventions pertain having the benefit of the teachings presented in the foregoing descriptions and the associated drawings.

The described features, structures, or characteristics may be combined in any suitable manner in one or more embodiments. In the above description, numerous specific details are provided for a thorough understanding of embodiments of the invention. One skilled in the relevant art will recognize, however, that embodiments of the invention can be practiced without one or more of the specific details, or with other methods, components, materials, etc. In other instances, well-known structures, materials, or operations may not be shown or described in detail . . . .

The invention claimed is:

1. An electrical outlet locking mechanism to attach to an electrical outlet, comprising:
  a cover plate adapter comprising:
    a front surface extending lengthwise from a top surface to a bottom surface and widthwise from a left side surface to a right side surface;
    a back surface opposite the front surface extending lengthwise from the top surface to the bottom surface and widthwise from the left side surface to the right side surface;
    wherein the top surface extends lengthwise from the left side surface to the right side surface and extends widthwise from the front surface to the back surface;
    wherein the bottom surface opposite the top surface extends lengthwise from the left side surface to the right side surface and extends widthwise from the front surface to the back surface;
    wherein the left side surface extends lengthwise from the top surface to the bottom surface and extends widthwise from the front surface to the back surface; and
    wherein the right side surface opposite the left side surface extends lengthwise from the top surface to the bottom surface and extends widthwise from the front surface to the back surface;

an attachment opening extending through the front surface and the back surface configured to receive a screw to attach the cover plate adapter to another surface separate from the electrical outlet locking mechanism;

at least one socket access opening extending through the front surface and the back surface of the cover plate adapter wherein the at least one socket access opening is sized and positioned to insert an electrical plug through the socket access opening to engage an electrical socket of an electrical outlet when the cover plate adapter is attached to the electrical outlet; and at least one pair of retaining tabs on opposite sides of the at least one socket access opening wherein the retaining tabs extend from the front surface of the cover plate and wherein each of the retaining tabs comprise a first part that extends from the front surface of the cover plate adapter and a second part that extends from a distal end of the first part thereby forming a projecting edge.

2. The electrical outlet locking mechanism of claim 1 wherein the cover plate adapter has a rectangular shape.

3. The electrical outlet locking mechanism of claim 1 wherein the cover plate adapter comprises:

a first socket access opening extending through the front surface and the back surface of the cover plate adapter wherein the first socket access opening is sized and positioned to insert an electrical plug through the first socket access opening to engage a first electrical socket of an electrical outlet when the cover plate adapter is attached to the electrical outlet;

a second socket access opening extending through the front surface and the back surface of the cover plate adapter wherein the second socket access opening is sized and positioned to insert an electrical plug through the second socket access opening to engage a second electrical socket of the electrical outlet when the cover plate adapter is attached to the electrical outlet;

a first pair of retaining tabs on opposite sides of the first socket access opening wherein the first pair of retaining tabs extend from the front surface of the cover plate; and a second pair of retaining tabs on opposite sides of the second socket access opening wherein the second pair of retaining tabs extend from the front surface of the cover plate, wherein each of the retaining tabs comprise a first part that extends from the front surface of the cover plate adapter and a second part that extends from a distal end of the first part thereby forming the projecting edge.

4. The electrical outlet locking mechanism of claim 1 further comprising a socket cover attachment comprising:

a socket cover attachment front surface extending lengthwise from a socket cover attachment top surface to a socket cover attachment bottom surface and widthwise from a socket cover attachment left side surface to a socket cover attachment right side surface;

a socket cover attachment back surface opposite the socket cover attachment front surface extending lengthwise from the socket cover attachment top surface to the socket cover attachment bottom surface and widthwise from the socket cover attachment left side surface to the socket cover attachment a right side surface;

wherein the socket cover attachment top surface extends lengthwise from the socket cover attachment left side surface to the socket cover attachment right side surface and extends widthwise from the socket cover attachment front surface to the socket cover attachment back surface;

wherein the socket cover attachment bottom surface opposite the socket cover attachment top surface extends lengthwise from the socket cover attachment left side surface to the socket cover attachment right side surface and extends widthwise from the socket cover attachment front surface to the socket cover attachment back surface;

wherein the socket cover attachment left side surface extends lengthwise from the socket cover attachment top surface to the socket cover attachment bottom surface and extends widthwise from the socket cover attachment front surface to the socket cover attachment back surface;

wherein the socket cover attachment right side surface opposite the socket cover attachment left side surface extends lengthwise from the socket cover attachment top surface to the socket cover attachment bottom surface and extends widthwise from the socket cover attachment front surface to the socket cover attachment back surface; and a pair of retaining openings on opposite sides of the socket cover attachment wherein the pair of retaining openings extend through the socket cover attachment front surface and the socket cover attachment back surface, wherein the pair of retaining openings are sized and positioned to receive the at least one pair of retaining tabs of the cover plate adapter to attach the socket cover attachment to the cover plate adapter and when the pair of retaining openings of the socket cover attachment receives the at least one pair of retaining tabs of the cover plate adapter, a portion of the front surface of the socket cover attachment is positioned under the projecting edge of the retaining tabs thereby lockingly engaging the socket cover attachment and the cover plate adapter.

5. The electrical outlet locking mechanism of claim 4 wherein when the pair of retaining openings of the socket cover attachment receives the at least one pair of retaining tabs of the cover plate adapter, the socket cover attachment is sized to fully cover the openings of the socket of an electrical outlet from at least one direction.

6. A method of using the electrical outlet locking mechanism of claim 4 to lockingly cover an electrical socket of an electrical outlet wherein a cover plate attaches to the electrical outlet, the method comprising:

attaching the cover plate adapter to the cover plate; and attaching the socket cover attachment to the cover plate adapter to lockingly cover an electrical socket of the electrical outlet.

7. The method of claim 6 wherein the cover plate comprises a screw opening and at least one socket opening sized to insert an electrical plug therethrough to engage an electrical socket of an electrical outlet, wherein attaching the cover plate adapter to the cover plate comprises:

aligning the attachment opening of the cover plate adapter with the screw opening of the cover plate;

aligning the at least one socket access opening of the cover plate adapter with the at least one socket opening of the cover plate to the electrical socket of the electrical outlet;

inserting a screw through the attachment opening of the cover plate adapter and the screw opening to attach the cover plate adapter to the cover plate and attach the cover plate to the electrical outlet;

positioning the attachment opening of the cover plate adapter in alignment with the screw opening of the cover plate and the first socket access opening and the second socket access opening of the cover plate adapter in alignment with the first socket opening and the second socket opening of the cover plate; and inserting the screw through and engaging the attachment opening and through the screw opening of the cover plate thereby attaching the cover plate adapter to the cover plate and attaching the cover plate to the electrical outlet; and wherein attaching the socket cover attachment to the cover plate adapter to lockingly cover an electrical socket of the electrical outlet comprises:

aligning the pair of retaining openings of the socket cover attachment with the at least one pair of retaining tabs of the cover plate adapter; and moving the socket cover attachment toward the at least one pair of retaining tabs of the cover plate adapter until the retaining openings of the socket cover attachment receive the retaining tabs, respectively, thereby attaching the socket cover attachment to the cover plate adapter.

8. The electrical outlet locking mechanism of claim 1 further comprising a plug retainer attachment comprising:

a plug retainer attachment front surface extending lengthwise from a plug retainer attachment top surface to a plug retainer attachment bottom surface and widthwise from a plug retainer attachment left side surface to a plug retainer attachment right side surface;

a plug retainer attachment back surface opposite the plug retainer attachment front surface extending lengthwise from the plug retainer attachment top surface to the plug retainer attachment bottom surface and widthwise from the plug retainer attachment left side surface to the plug retainer attachment right side surface;

wherein the plug retainer attachment top surface extends lengthwise from the plug retainer attachment left side surface to the plug retainer attachment right side surface and extends widthwise from the plug retainer attachment front surface to the plug retainer attachment back surface;

wherein the plug retainer attachment bottom surface opposite the plug retainer attachment top surface extends lengthwise from the plug retainer attachment left side surface to the plug retainer attachment right side surface and extends widthwise from the plug retainer attachment front surface to the plug retainer attachment back surface;

wherein the plug retainer attachment left side surface extends lengthwise from the plug retainer attachment top surface to the plug retainer attachment bottom surface and extends widthwise from the plug retainer attachment front surface to the plug retainer attachment back surface;

wherein the right side surface opposite the plug retainer attachment left side surface extends lengthwise from the plug retainer attachment top surface to the plug retainer attachment bottom surface and extends widthwise from the plug retainer attachment front surface to the plug retainer attachment back surface;

a plug retainer attachment opening that extends lengthwise from the plug retainer attachment bottom surface and through the plug retainer attachment front surface and the plug retainer attachment back surface wherein the opening defines an inner edge and wherein the inner edge is configured to engage the outer surface of an electrical plug; and a pair of plug retainer attachment retaining openings on opposite sides of the plug retainer attachment wherein the pair of plug retainer attachment retaining openings extend through the plug retainer attachment front surface and the plug retainer attachment back surface, wherein the pair of plug retainer attachment retaining openings are sized and positioned to receive the at least one pair of retaining tabs of the cover plate adapter to attach the plug retainer attachment to the cover plate adapter and when the pair of plug retainer attachment retaining openings receives the at least one pair of retaining tabs of the cover plate adapter, a portion of the plug retainer attachment front surface is positioned under the projecting edge of the retaining tabs of the cover plate adapter thereby lockingly engaging the plug retainer attachment and the cover plate adapter.

9. The electrical outlet locking mechanism of claim 8 wherein the largest width of the plug retainer attachment opening is smaller than the largest width of an electrical plug so that the plug retainer attachment opening partially receives the electrical plug.

10. The electrical outlet locking mechanism of claim 8 wherein the plug retainer attachment opening is configured so that a portion of the back surface of the plug retainer attachment adjacent to the plug retainer attachment opening rests on a ledge of an electrical plug.

11. A method of using the electrical outlet locking mechanism of claim 8 to lockingly retain an electrical plug in engagement with an electrical socket of an electrical outlet, wherein a cover plate attaches to the electrical outlet, the method comprising:

attaching the cover plate adapter to the cover plate; and
attaching the plug retainer attachment to the cover plate adapter to lockingly retain the electrical plug in engagement with the electrical socket of the electrical outlet.

12. The method of claim 11 wherein the cover plate comprises a screw opening and at least one socket opening sized to insert an electrical plug therethrough to engage an electrical socket of an electrical outlet, wherein attaching the cover plate adapter to the cover plate comprises:
aligning the attachment opening of the cover plate adapter with the screw opening of the cover plate;
aligning the at least one socket access opening of the cover plate adapter with the at least one socket opening of the cover plate to the electrical socket of the electrical outlet;
inserting a screw through the attachment opening of the cover plate adapter and the screw opening to attach the cover plate adapter to the cover plate and attach the cover plate to the electrical outlet;
positioning the attachment opening of the cover plate adapter in alignment with the screw opening of the cover plate and the first socket access opening and the second socket access opening of the cover plate adapter in alignment with the first socket opening and the second socket opening of the cover plate; and
inserting the screw through and engaging the attachment opening and through the screw opening of the cover plate thereby attaching the cover plate adapter to the cover plate and attaching the cover plate to the electrical outlet; and wherein attaching the plug retainer attachment to the cover plate adapter to lockingly retain an electrical plug in engagement with an electrical socket of an electrical outlet comprises:

passing an electrical cord of the electrical plug through the opening of the plug retainer attachment at the bottom surface of the plug retainer attachment;

positioning a portion of the electrical plug in the opening of the plug retainer attachment so that the inner edge of the plug retainer attachment engages an outer surface of the electrical plug;

aligning the pair of retaining openings of the plug retainer attachment with the at least one pair of retaining tabs of the cover plate adapter; and moving the plug retainer attachment toward the at least one pair of retaining tabs of the cover plate adapter until the retaining openings of the plug retainer attachment receive the retaining tabs, respectively, thereby attaching the plug retainer attachment to the cover plate adapter.

13. An electrical outlet locking mechanism to attach to an electrical outlet, comprising:

a cover plate adapter comprising:
  a front surface extending lengthwise from a top surface to a bottom surface and widthwise from a left side surface to a right side surface;
  a back surface opposite the front surface extending lengthwise from the top surface to the bottom surface and widthwise from the left side surface to the right side surface;
  wherein the top surface extends lengthwise from the left side surface to the right side surface and extends widthwise from the front surface to the back surface;
  wherein the bottom surface opposite the top surface extends lengthwise from the left side surface to the right side surface and extends widthwise from the front surface to the back surface;
  wherein the left side surface extends lengthwise from the top surface to the bottom surface and extends widthwise from the front surface to the back surface; and
  wherein the right side surface opposite the left side surface extends lengthwise from the top surface to the bottom surface and extends widthwise from the front surface to the back surface;
  an attachment opening extending through the front surface of the cover plate adapter and the back surface of the cover plate adapter wherein the attachment opening is configured to receive a screw to attach the cover plate adapter to a surface;
  at least one socket access opening extending through the front surface and the back surface of the cover plate adapter wherein the at least one socket access opening is sized and positioned to insert an electrical plug through the socket access opening to engage an electrical socket of an electrical outlet when the cover plate adapter is attached to the electrical outlet;
  at least one pair of retaining tabs on opposite sides of the at least one socket access opening wherein the retaining tabs extend from the front surface of the cover plate and wherein each of the retaining tabs comprise a first part that extends from the front surface of the cover plate adapter and a second part that extends from a distal end of the first part thereby forming a projecting edge;

a socket cover attachment comprising:
  a socket cover attachment front surface extending lengthwise from a socket cover attachment top surface to a socket cover attachment bottom surface and widthwise from a socket cover attachment left side surface to a socket cover attachment right side surface;
  a socket cover attachment back surface opposite the socket cover attachment front surface extending lengthwise from the socket cover attachment top surface to the socket cover attachment bottom surface and widthwise from the socket cover attachment left side surface to the socket cover attachment right side surface;
  wherein the socket cover attachment top surface extends lengthwise from the socket cover attachment left side surface to the socket cover attachment right side surface and extends widthwise from the socket cover attachment front surface to the socket cover attachment back surface;
  wherein the socket cover attachment bottom surface opposite the socket cover attachment top surface extends lengthwise from the socket cover attachment left side surface to the socket cover attachment right side surface and extends widthwise from the socket cover attachment front surface to the socket cover attachment back surface;
  wherein the socket cover attachment left side surface extends lengthwise from the socket cover attachment top surface to the socket cover attachment bottom surface and extends widthwise from the socket cover attachment front surface to the socket cover attachment back surface;
  wherein the socket cover attachment right side surface opposite the socket cover attachment left side surface extends lengthwise from the socket cover attachment top surface to the socket cover attachment bottom surface and extends widthwise from the socket cover attachment front surface to the socket cover attachment back surface; and
  a pair of retaining openings on opposite sides of the socket cover attachment wherein the pair of retaining openings extend through the front surface and the back surface of the socket cover attachment, wherein the pair of retaining openings are sized and positioned to receive the at least one pair of retaining tabs of the cover plate adapter to attach the socket cover attachment to the cover plate adapter and when the pair of retaining openings of the socket cover attachment receives the at least one pair of retaining tabs of the cover plate adapter, a portion of the front surface of the socket cover attachment is positioned under the projecting edge of the retaining tabs thereby lockingly engaging the socket cover attachment and the cover plate adapter; and a plug retainer attachment comprising:
  a plug retainer attachment front surface extending lengthwise from a plug retainer attachment top surface to a plug retainer attachment bottom surface and widthwise from a plug retainer attachment left side surface to a plug retainer attachment right side surface;
  a plug retainer attachment back surface opposite the plug retainer attachment front surface extending lengthwise from the plug retainer attachment top surface to the plug retainer attachment bottom surface and widthwise from the plug retainer attachment left side surface to the plug retainer attachment right side surface;
  wherein the plug retainer attachment top surface extends lengthwise from the plug retainer attachment left side surface to the plug retainer attachment right side surface and extends widthwise from the plug retainer attachment front surface to the plug retainer attachment back surface;

wherein the plug retainer attachment bottom surface opposite the plug retainer attachment top surface extends lengthwise from the plug retainer attachment left side surface to the plug retainer attachment right side surface and extends widthwise from the plug retainer attachment front surface to the plug retainer attachment back surface;

wherein the plug retainer attachment left side surface extends lengthwise from the plug retainer attachment top surface to the plug retainer attachment bottom surface and extends widthwise from the plug retainer attachment front surface to the plug retainer attachment back surface;

wherein the plug retainer attachment right side surface opposite the plug retainer attachment left side surface extends lengthwise from the plug retainer attachment top surface to the plug retainer attachment bottom surface and extends widthwise from the plug retainer attachment front surface to the plug retainer attachment back surface;

a plug retainer attachment opening that extends lengthwise from the bottom surface and through the front surface and the back surface of the plug retainer attachment wherein the plug retainer attachment opening defines an inner edge and wherein the inner edge is configured to engage the outer surface of an electrical plug; and a pair of plug retainer attachment retaining openings on opposite sides of the plug retainer attachment wherein the pair of plug retainer attachment retaining openings extend through the front surface and the back surface of the plug retainer attachment, wherein the pair of plug retainer attachment retaining openings are sized and positioned to receive the at least one pair of retaining tabs of the cover plate adapter to attach the plug retainer attachment to the cover plate adapter and when the pair of plug retainer attachment retaining openings receives the at least one pair of retaining tabs of the cover plate adapter, a portion of the front surface of plug retainer attachment is positioned under the projecting edge of the retaining tabs thereby lockingly engaging the plug retainer attachment and the cover plate adapter.

* * * * *